United States Patent
Harper et al.

(10) Patent No.: US 6,820,215 B2
(45) Date of Patent: Nov. 16, 2004

(54) SYSTEM AND METHOD FOR PERFORMING AUTOMATIC REJUVENATION AT THE OPTIMAL TIME BASED ON WORK LOAD HISTORY IN A DISTRIBUTED DATA PROCESSING ENVIRONMENT

(75) Inventors: Richard Edwin Harper, Chapel Hill, NC (US); Steven Wade Hunter, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 09/753,050

(22) Filed: Dec. 28, 2000

(65) Prior Publication Data

US 2002/0087913 A1 Jul. 4, 2002

(51) Int. Cl.[7] .................................................. H02H 3/05
(52) U.S. Cl. ........................................ 714/15; 714/38
(58) Field of Search .............................. 714/15, 16, 20, 714/25, 26, 37, 38, 39; 717/124, 126, 128

(56) References Cited

U.S. PATENT DOCUMENTS

| | | |
|---|---|---|
| 4,590,586 A | 5/1986 | Zenk et al. |
| 5,216,612 A | 6/1993 | Cornett et al. |
| 5,623,404 A | 4/1997 | Collins et al. |
| 5,715,386 A | 2/1998 | Fulton, III et al. |
| 5,752,216 A | 5/1998 | Carlson et al. |
| 5,920,700 A | 7/1999 | Gordon et al. |
| 6,021,262 A | 2/2000 | Cote et al. |
| 6,216,237 B1 * | 4/2001 | Klemm et al. ............... 714/38 |
| 6,247,118 B1 * | 6/2001 | Zumkehr et al. ............ 712/228 |
| 6,594,784 B1 * | 7/2003 | Harper et al. ................ 714/47 |
| 6,629,266 B1 * | 9/2003 | Harper et al. ................ 714/38 |
| 2003/0191829 A1 * | 10/2003 | Masters et al. .............. 709/223 |

OTHER PUBLICATIONS

"Scaleability, Availability and Load–balancing for TCP/IP Applications," Chris Gage, Senior Software Engineer, IBM Corporation, Research Triangle Park, North Carolina, Apr. 1999 IBM Secure Way Network Dispatcher Version 2.1.

* cited by examiner

*Primary Examiner*—Dieu-Minh Le
(74) *Attorney, Agent, or Firm*—Dillon & Yudell LLP (57) ABSTRACT

In a method for automatically rejuvenating a component of a distributed data processing environment while minimizing the disruptive effects of the rejuvenation, a usage history for a distributed data processing environment is stored. The usage history describes multiple levels of overall usage of the distributed data processing environment over time. Also, health data relating to at least one component of the distributed data processing environment is received, and, in response, the health data is automatically utilized to determine a failure time within which that component is likely to require rejuvenation. In response to determining the failure time, the usage history is automatically utilized to identify an optimum rejuvenation time. In response to identifying the optimum rejuvenation time, that component is automatically rejuvenated according to the optimum rejuvenation time. In an illustrative embodiment, the optimum rejuvenation time is identified by ascertaining a minimum level of overall usage within the failure time. The usage time that corresponds to the minimum level is utilized as the optimum rejuvenation time.

19 Claims, 4 Drawing Sheets

SYSTEM AND METHOD FOR PERFORMING AUTOMATIC REJUVENATION AT THE OPTIMAL TIME BASED ON WORK LOAD HISTORY IN A DISTRIBUTED DATA PROCESSING ENVIRONMENT

CROSS-REFERENCE TO RELATED APPLICATIONS

The present application is related to U.S. patent application Ser. No. 09/752,840 entitled "SYSTEM AND METHOD FOR RELIABILITY-BASED LOAD BALANCING AND DISPATCHING USING SOFTWARE REJUVENATION", filed on even date herewith. That related application is hereby incorporated.

BACKGROUND OF THE INVENTION

1. Field of the Invention

The present invention relates in general to computer systems and in particular to distributed data processing environments. More specifically, the present invention relates to a system and method for automatically rejuvenating software in a distributed data processing environment.

2. Description of Related Art

A collaborative data processing environment is a collection of two or more individual data processing systems that cooperate to perform one or more tasks by sharing resources (such as information). Relationships between some data processing systems may change rapidly, with the result that some collaborative data processing environments exist only briefly. For example, when a person utilizes a personal computer (PC) to retrieve data from a Web server, the PC and the Web server typically cooperate in the performance of that task only briefly before reallocating resources to other tasks, resulting in a short-lived collaborative data processing environment containing that PC and that Web server. On the other hand, the relationships between certain data processing systems may be relatively permanent, giving rise to more stable collaborative data processing environments.

One common type of collaborative data processing environment that is usually relatively stable is a distributed data processing environment. A distributed data processing environment is a collaborative data processing environment which includes two or more data processing systems that are both configured to perform at least a subset of common tasks on behalf of the collaborative data processing environment. When two or more data processing systems are configured and grouped in such a way that the group's work can be processed by any one of the data processing systems, the data processing systems are said to be clustered. Among the benefits that may be realized from clustering are scalability, load balancing, and increased availability.

A common type of distributed data processing environment or data processing system cluster is the server cluster. In a server cluster, two or more data processing systems are configured to perform at least a subset of common server tasks, such as responding to requests for information from external data processing systems. Another universal characteristic of server clusters is that each server cluster is configured to interact with external data processing systems substantially as if the server cluster were a single server machine.

Server clusters are typically configured to distribute the workload of the server cluster among multiple server machines, thereby providing for better performance (e.g., increased reliability, processing power, and/or input/output (I/O) throughput) than can be obtained from one server machine in isolation. Web servers, for example, are frequently implemented as server clusters. A web server is a data processing system or a server cluster which has been assigned an internet protocol (IP) address and which contains server control logic (typically implemented as server software) that receives and processes requests addressed to that IP address from external data processing systems. Typically, a web server will service a client request by utilizing hypertext transfer protocol (HTTP) to transmit information to the originating client. The information provided by a web server can be in the form of programs which run locally on the client or in the form of data such as files that are used by other programs. When a web server is implemented as a server cluster, multiple server machines within the server cluster cooperate to service the client requests.

When operating as a Web server, a typical server cluster includes a dispatching component (i.e., a dispatcher) that dynamically monitors and balances application workload among individual servers in real time. Lightly loaded servers are preferentially given workloads over heavily loaded servers, in an attempt to keep all servers equally loaded, and prevent any servers from becoming overloaded. The main advantages of load balancing are that it allows heavily accessed Web sites to increase capacity, since multiple server machines can be dynamically added while retaining the abstraction of a single entity that appears in the network as a single logical server. In addition, failure of one or more of the server machines in a server cluster need not completely disable the operation of remainder of the server cluster. Additional detail regarding dispatcher operation is provided in the related application referenced above.

While distributed data processing environments such as server clusters provide important advantages, among the disadvantages associated with distributed data processing environments, relative to isolated data processing systems, are increased system configuration and maintenance requirements. That is, it is not sufficient to simply configure and maintain the hardware and software of a single machine. Rather, it is necessary to configure and maintain multiple machines, as well as the mechanisms that allow those machines to interact with external data processing systems as if the cluster were a single machine. Moreover, it is often desirable to keep distributed data processing environments, such as server clusters, operational continuously. For example, Web servers are often expected to be operational 24 hours a day, 7 days a week (24/7). Therefore, when such a Web server is implemented as a server cluster, reconfiguring or performing maintenance on one or more of the components (e.g., server machines) of the server cluster should be accomplished without disabling operations of the server cluster as a whole.

One problem that system maintenance alleviates or counteracts is a phenomenon known as software aging. Software aging is a common condition, wherein a data processing system's probability of failure (i.e., failure rate) increases over time and/or the data processing system's performance decreases over time, typically because of programming errors that generate increasing and unbounded resource consumption, or due to data corruption and numerical error accumulation (e.g., rounding errors). Examples of the effects of such errors are memory leaks, file systems that fill up over time, and spawned threads or processes that are never terminated. Software aging may be caused by errors in a program application, operating system software, or "middleware" (software adapted to provide an interface between applications and an operating system). As the allocation of a system's resources gradually approaches a critical level (i.e., as the system approaches resource exhaustion), the probability that the system will suffer an outage increases, and the system's performance may decrease. Among the possible consequences of software aging are overall system failure, software application failure, hanging, performance degradation, etc.

One way to counteract software aging is to reset at least a portion of the system to recover any lost and unused resources. For example, this may be accomplished by resetting just the application that is responsible for the aging or by resetting the entire system (see, e.g., U.S. Pat. No. 5,715,386). These processes are known as partial software rejuvenation and complete software rejuvenation, respectively (or simply partial rejuvenation and complete rejuvenation). When the part of the system that is undergoing aging is reinitialized via rejuvenation, the system's failure rate reverts back to its initial (i.e., lower) level because resources have been released and/or the effects of numerical errors have been removed, etc. However, when the failure rate begins to climb again due to the above-mentioned causes, subsequent rejuvenations become necessary. Nevertheless, software rejuvenation can dramatically lengthen a system's time between failures.

However, it can be difficult to perform software rejuvenation in a distributed data processing environment without adversely affecting the performance of the distributed data processing environment, especially if the distributed data processing environment is expected to be operational 24/7. For example, in conventional server clusters, workload can be steered away from a faulty server, but only after that server has catastrophically failed. However, waiting for a component of a distributed data processing environment to fail before steering workload away from that component typically results in adverse consequences. For example, waiting for failure of a server in a server cluster before steering workload away from that server makes it necessary to process additional workload to recover from the failure. In particular, when a component fails unexpectedly, in addition to the cluster's usual workload, the cluster must service additional requests, such as large temporary surge in session reconnection attempts, which may cause increased network traffic, dispatcher CPU utilization, and, in some cases, client reconnections. Such disruptive behavior is highly undesirable in a distributed data processing environment, particularly during times of high utilization of the data processing environment.

As recognized by the present invention, it would therefore be beneficial to devise a method of reducing or eliminating performance degradation, partial outages, and/or complete outages in a distributed data processing environment caused by effects such as software aging. It would be further advantageous if such a method could be implemented transparently to external data processing systems utilizing the distributed data processing environment. Yet additional advantages could be realized if the effects of software aging could be countered automatically and without noticeably reducing the performance of the distributed data processing environment while rejuvenation is being performed.

SUMMARY OF THE INVENTION

The present invention relates to a method of automatically rejuvenating a component of a distributed data processing environment while minimizing the disruptive effects of the rejuvenation. According to that method, a usage history for a distributed data processing environment is stored, the usage history describing multiple levels of overall usage of the distributed data processing environment over time. Also, health data relating to at least one component of the distributed data processing environment is received, and, in response, the health data is automatically utilized to determine a failure time within which that component is likely to require rejuvenation. In response to determining the failure time, the usage history is automatically utilized to identify an optimum rejuvenation time. In response to identifying the optimum rejuvenation time, that component is automatically rejuvenated according to the optimum rejuvenation time.

In an illustrative embodiment, the distributed data processing environment is a server cluster. Also, the optimum rejuvenation time is identified by ascertaining a minimum level of overall usage of the server cluster within the remaining time to the predicted failure. The usage time that corresponds to the minimum level is utilized as the optimum rejuvenation time.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention is directed to automating maintenance responsibilities in a distributed data processing environment, particularly to performing automatic rejuvenation in a distributed data processing environment. The invention may be utilized to advantage in myriad types of computing environments where dispatching to an aggregate of processing entities or modules is used. Such environments include, without limitation, transaction processing, file serving, application serving, messaging, mail serving, and many others.

For example, transaction monitors (such as those known as ENCINA and TUXEDO) dispatch transactions to one of several database or transaction servers, depending on which database or transaction server has the lowest workload. Message queuing dispatchers (such as those in the family of message queuing dispatchers known as the MQSeries) distribute messages to one of a series of queue stores, depending on which queue store has the smallest queue size. A file serving front end (such as a network-attached storage device) dispatches requests for a file or storage block to one of a number of replicated disk subsystems, depending on which is least busy. An application server farm, consisting of a large aggregate of computers performing tasks such as integrated-circuit simulation, usually contains a dispatcher that dispatches a simulation job to the next available server. An operating system dispatcher schedules tasks to execute on the processors of a multiprocessor, based on the utilization of each processor. An IP dispatcher (such as the IBM software known as NETWORK DISPATCHER) distributes requests for web pages to a number of HTTP servers, Secure Sockets Layer (SSL) servers, File Transfer Protocol (FTP) servers, or Web-page caches, depending on the type of the request and which server of a given class has the lowest utilization. The present invention could be utilized to advantage in all of the above environments. For purposes of illustration, however, the present invention is described with reference to an exemplary embodiment operating within a computer network such as the Internet.

Figure 1:
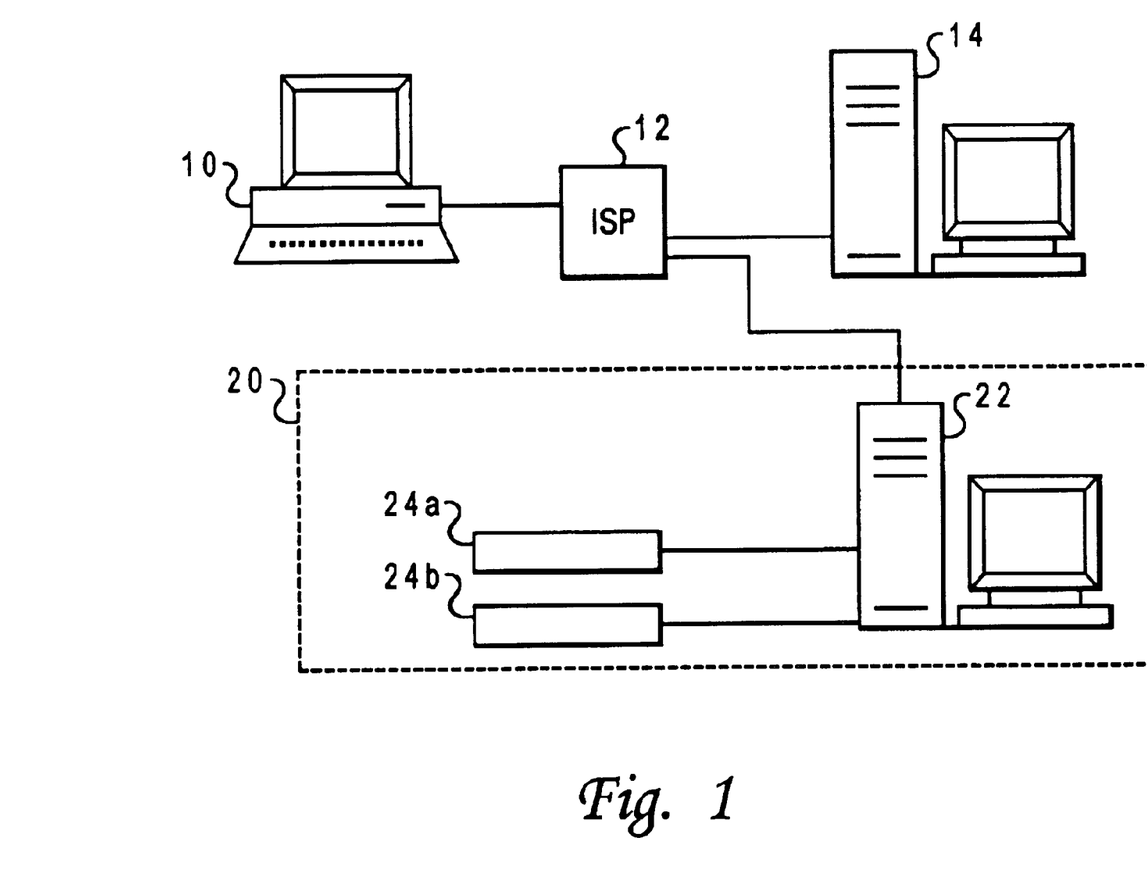
FIG. 1 is a schematic diagram of a computer network including an exemplary server cluster according to the present invention.

Specifically, with reference to FIG. 1, there is illustrated an exemplary generalized client/server computing network which includes three nodes: a client 10 and two Web servers. Client 10 is connected to the two Web servers via an Internet service provider (ISP) 12, and client 10 utilizes Transmission Control Protocol/Internet Protocol (TCP/IP) to communicate with the two Web servers. In FIG. 1, one of the Web servers, server 14, is implemented as a stand-alone computer system, having one or more processors, memory devices, and communications devices. The other Web server is implemented as a server cluster 20. As shown, in the exemplary embodiment, server cluster 20 includes a dispatcher 22 and two server machines 24a and 24b. While two servers are shown, those skilled in the art will appreciate that a different number of servers may be utilized in variations of the present invention. As explained in greater detail below, server cluster 20 also includes facilities, in accordance with the present invention, for performing automatic rejuvenation.

Figure 2:
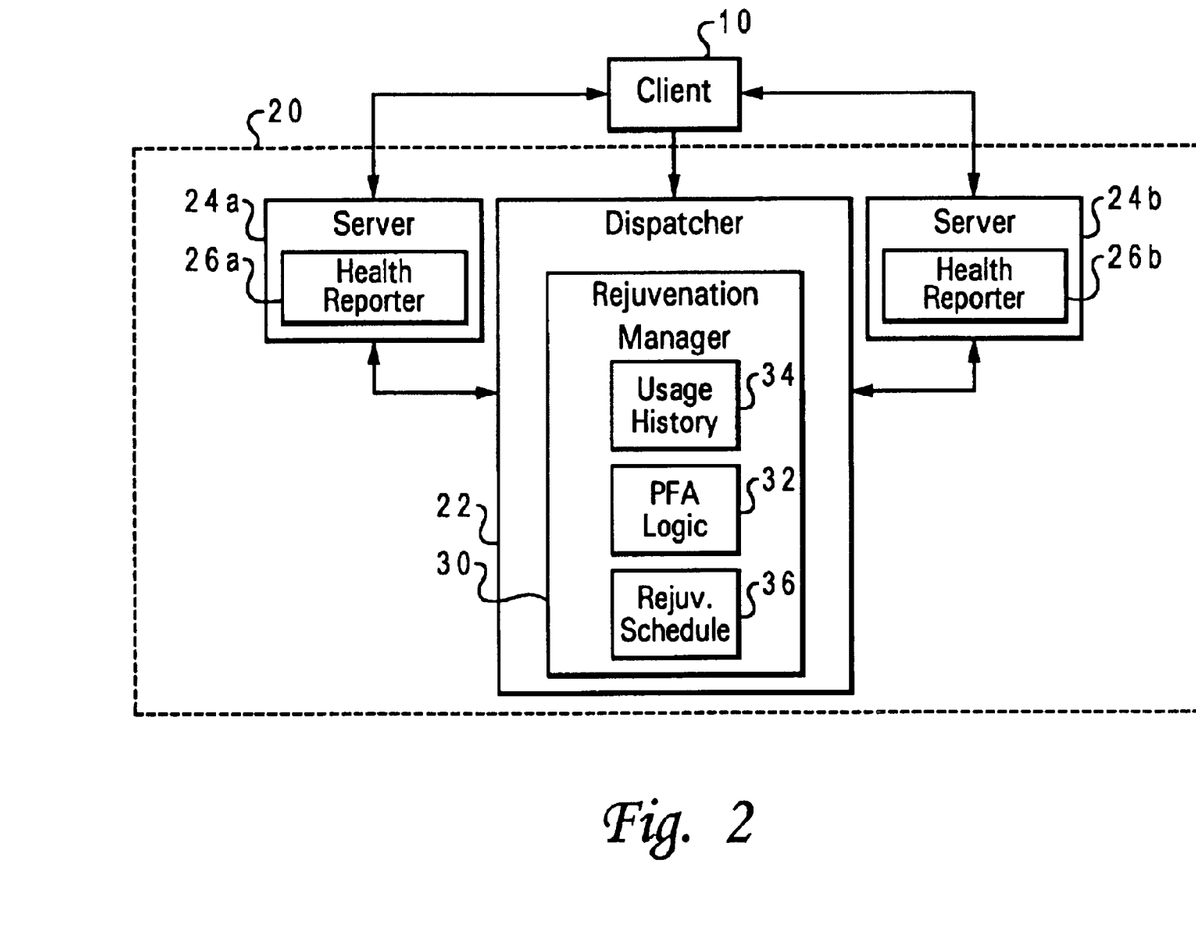
FIG. 2 is a block diagram illustrating the logical components of one embodiment of a server cluster in accordance with the present invention.

Referring now to FIG. 2, there is depicted a block diagram of an exemplary collection of components that cooperate to provide for automatic rejuvenation in accordance with the present invention, in the context of the server cluster illustrated in FIG. 1. Those components are described briefly below, and a fuller description is then provided with reference to an exemplary process for performing automatic rejuvenation according to the present invention.

In particular, in addition to conventional server software (not illustrated), server machines 24a and 24b include health reporters 26a and 26b, respectively. Health reporters 26a and 26b monitor the current conditions of server machines 24a and 24b, respectively, with regard to signs of software aging, and transmit health data describing those conditions to dispatcher 22. The health data includes current levels of system resource allocation (such as current levels of file system and memory utilization and counts of active threads and processes), and may include specifications of levels of resource allocation at which risk of failure is considered critical.

For example, in addition to health data relating to a data processing system as a whole, the health data may identify particular applications (such as an e-mail server, a web cache appliance within a web hosting system, etc.) that are exhibiting signs of resource exhaustion on that particular machine. Further, the health data may identify specific processes within those applications and may provide resource-utilization statistics for each of those processes. As described below, this health data is used to predict resource exhaustion for a particular data processing system as a whole, for an application on a data processing system, or for a specific process of an application.

Further, each server preferably also includes an application performance monitor (not illustrated) which provides dispatcher 22 with performance-related messages or data for use in allocating workload among server machines 24a and 24b, as described in the related application referenced above. However, in alternative embodiments, the application performance monitors and health reporters could be implemented as a single component that provides both the performance related and the health related data.

With regard to the other components of server cluster 20, in the exemplary embodiment, dispatcher 22 features a conventional interface (not illustrated) for communicating with external network components (such as routers and clients) and conventional dispatching software (not illustrated) for performing load balancing among the server machines of the server cluster. In addition, dispatcher 22 includes a rejuvenation manager 30 that receives the health data from health reporters 26a and 26b. Rejuvenation manager 30 utilizes predictive failure analysis (PFA) logic 32 to automatically analyze the health data to determine whether software aging is approaching a critical level. Dispatcher 22 also includes a usage history 32 that describes multiple levels of overall usage of server cluster 20 over time.

Figure 3:
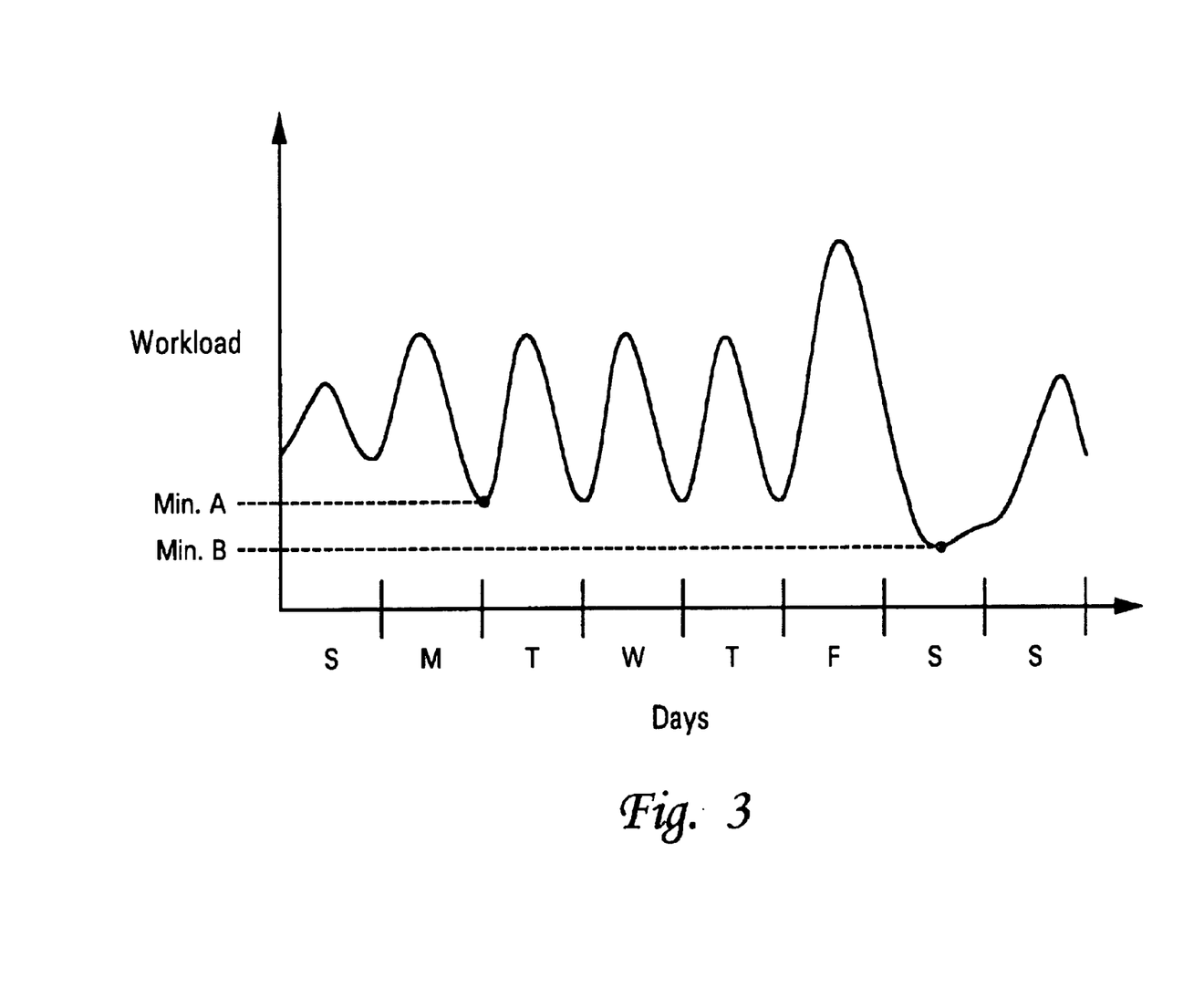
FIG. 3 is an exemplary graph depicting aggregate workload levels of a server cluster over a period of eight days, as might be recorded in the usage history depicted in FIG. 2, for example.

Referring now also to FIG. 3, there is illustrated a graph depicting levels of overall system utilization for a particular period of time according to exemplary history data stored in usage history 32. In the illustrative embodiment, usage history 32 reflects the workload of server cluster 20 in fifteen minute intervals over the preceding period of eight days.

In the illustrative embodiment, a system administrator may edit a configuration file to specify the type of history data to be collected for particular machines and/or applications, so that different types of statistics are collected from different components of server cluster 20. Among the myriad types of information that may be collected are statistics describing the overall workload of a machine, the number of network requests received during a predetermined time interval by a particular machine or application, the number of users connected to a particular machine or application, the system resources (such as memory allocations) utilized to service needs for local processing such as backup routines. The statistics may be collected by a tool known as a capacity manager.

As reflected in FIG. 3, usage history 32 indicates that server cluster 20 is heavily loaded in the middle of each week day, with workload decreasing as workers go home in the evenings. Also, workload hits a weekly maximum on Friday evening when weekly account processing is performed, a weekly minimum on Saturday, and an intermediate level on Sunday when weekly backups are performed.

Figure 4:
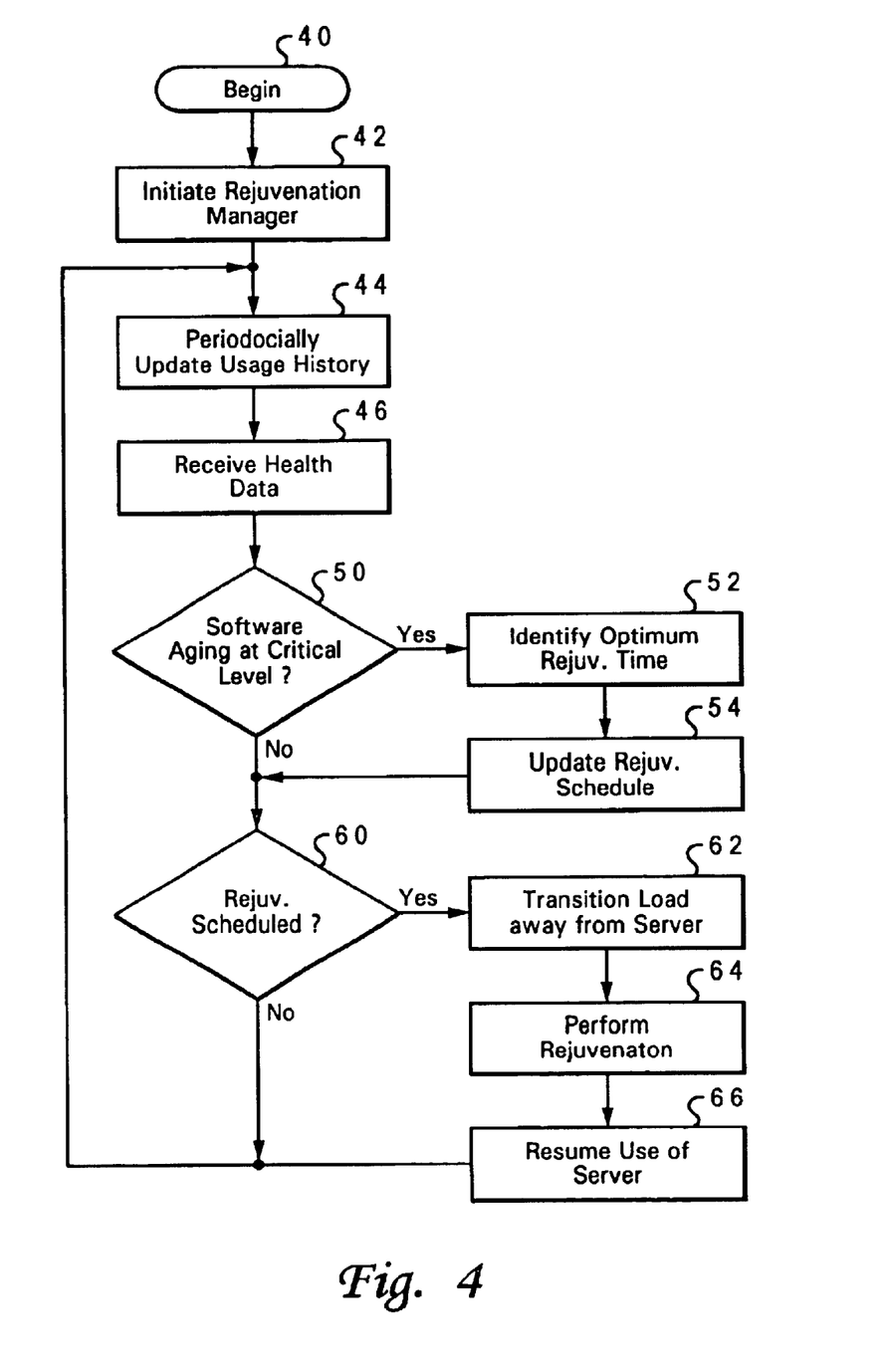
FIG. 4 is a high-level logical flowchart depicting one embodiment of a method for automatically rejuvenating a component of a server cluster while minimizing the disruptive effects of the rejuvenation, according to the present invention.

With reference now also to FIG. 4, there is depicted an exemplary process, according to the present invention, for performing automatic rejuvenation in a server cluster. For illustrative purposes, this exemplary process is described within the context of server cluster 20 of FIGS. 1 and 2. The process begins at block 40 with server cluster 20 being activated. Then, as part of the activation process, rejuvenation manager 30 is initiated, illustrated at block 42.

The initiation of rejuvenation manager 30 preferably includes the actions of consulting a list of initiation parameters and configuring rejuvenation manager 30 to operate in accordance with those parameters. The initiation parameters may include the following: (1) a specification of the maximum period of time to consider when determining whether software aging is approaching a critical level (i.e., a maximum critical period, with failures that are predicted to occur subsequent to expiration of that period being disregarded); (2) a granularity level for specifying the duration for each workload measurement for purposes of updating usage history 34; and (3) a history horizon for specifying the number of days to be reflected in usage history 34. In addition, if the network administrator does not specify values for those parameters, default values may be utilized. Also, in one embodiment, validation logic is utilized to constrain the parameter values. For example, the maximum critical period may be restricted to a value of no less than one day and no more than fourteen days, the granularity level may be restricted to a value of no less than fifteen minutes and no more than one hour, and the history horizon may be restricted to a value of no less than eight days and no more than four weeks. In practice, the granularity level should correlate roughly to the amount of time required to perform rejuvenation. For example, in server clusters which utilize operating systems (OSs) that reboot quickly (such as the operating system known as LINUX), short periods (such as five minutes) may be used, while longer periods (such as fifteen minutes) may be used in server clusters with OSs that require more time to reboot (such as OSs in the WINDOWS® family). In addition to the time required for the OS to restart, the time to reboot preferably also includes the time needed for the necessary applications to restart. In the illustrative embodiment, no values are specified for the initiation parameters, and the following default values are utilized: a maximum critical period of seven days, a granularity level of fifteen minutes, and a history horizon of eight days.

Once server cluster 20 has been activated, dispatcher 22 begins receiving network requests from clients such as client 10 and distributing those requests among servers 24a and 24b, as described in the related application referenced above. In addition, in the illustrative embodiment, rejuvenation manager 30 automatically updates usage history 34 every fifteen minutes, storing therein data reflecting the aggregate workload of server cluster 20 for the preceding fifteen-minute interval, as depicted at block 44. In alternative embodiments, however, usage history 34 may be built manually by a network administrator or may be built automatically and altered manually, for example to replace anomalous readings due to holidays, etc.

The process then passes to block 46, which illustrates rejuvenation manager 30 receiving health data from health reporters 26a and 26b. Rejuvenation manager 30 then automatically utilizes PFA logic 32 to determine whether software aging is approaching a critical level (i.e., whether server 24a or server 24b is likely to suffer detrimental effects of software aging, such as complete or partial failure, within the maximum critical period), as shown at block 50. PFA logic 32 may include conventional formulas for predicting software failures, such as the formulas described in U.S. patent application Ser. No. 5,715,386. When it is determined that software aging is approaching a critical level, scheduling logic within rejuvenation manager 30 automatically consults usage history 32 to identify an optimum time for rejuvenation and automatically updates a rejuvenation schedule 36 accordingly, as shown at blocks 52 and 54, respectively. In particular, rejuvenation manager 30 specifies, in rejuvenation schedule 36, the time to begin rejuvenation, the particular server which requires rejuvenation, and, if appropriate, the particular application within that server which requires rejuvenation, in accordance with the received health data and the corresponding failure analysis.

For example, with reference again to FIG. 3, if it is determined on Monday morning that a particular application on server 24a is expected to fail at the expiration of one day, rejuvenation manager 30 will automatically determine, by reference to usage history 34, that a minimum level of system usage within the critical period of one day is expected to occur at midnight on Monday, as indicated by the point at the end of the dashed line labeled Min. A. Consequently, rejuvenation manager 30 will add to rejuvenation schedule 36 an entry specifying that the application in question is to be rejuvenated, beginning at midnight on Monday. Likewise, if it is determined that a second application is expected to fail at the expiration of one week, rejuvenation manager 30 will automatically determine that a minimum level of system usage within the critical period of one week is expected to occur at noon on Saturday, as indicated by the point at the end of the dashed line labeled Min. B. Consequently, rejuvenation manager 30 will add to rejuvenation schedule 36 an entry specifying that the second application is to be rejuvenated, beginning at noon on Saturday.

Returning now to FIG. 4, after rejuvenation schedule 36 has been updated, or if it is determined at block 50 that software aging has not reached a critical level, the process passes to block 60, which illustrates rejuvenation manager 30 consulting rejuvenation schedule 36 to determine whether a rejuvenation is scheduled to be performed currently. If a rejuvenation is scheduled to begin, the process then passes to block 62, which illustrates dispatcher 22 shifting workload away from the server to be rejuvenated, preferably by means of attrition. That is, preferably, no new client requests are dispatched to that server, but existing client sessions on that server are allowed to finish normally before the connections to those clients are closed.

Once the server has been freed from use, that server is rejuvenated, either partially or completely, as dictated by rejuvenation schedule 36, as shown at block 64. The component of server cluster 20 to be reinitialized might be a particular application (such as the sever application), middleware, or the operating system. For example, if the server application is scheduled to be rejuvenated, rejuvenation manager 30 may terminate and restart the server application via terminate and restart system calls. Similarly, if the OS is scheduled for rejuvenation, rejuvenation manager 30 may issue a command to initiate a complete software reboot of the machine upon which that OS is running.

Once rejuvenation is finished, the rejuvenated server actively rejoins server cluster 20, in that dispatcher 22 resumes distributing a share of the workload to the rejuvenated server, as depicted at block 66. Once the rejuvenated server rejoins server cluster 20, or if it was determined at block 60 that no rejuvenation was scheduled to begin, the process returns to block 44 and the process described above is repeated, in accordance with changing conditions within server cluster 20.

The present invention thus proactively rejuvenates components of distributed data processing environments, rather than reacting to failures after the fact, thereby reducing or eliminating unexpected service interruptions and performance degradation. This procedure improves the overall system availability to end users, and transparently transitions end users to a more reliable operating environment. Moreover, by scheduling rejuvenations for times at which server cluster workload is low, the present invention avoids causing any noticeable performance degradation, as far as the end users of the server cluster are concerned. Furthermore, the present invention does not significantly increase the work of the network administrators, because, according to the present invention the rejuvenations are scheduled and performed automatically.

Although the present invention has been described with reference to specific embodiments, this description is not meant to be construed in a limiting sense. Various modifications of the disclosed embodiments, as well as alternative embodiments of the present invention, will become apparent to persons skilled in the art upon reference to the description of the present invention. For instance, although the present invention has been described with reference to an illustrative embodiment operating within the Internet, the present invention could also be utilized to advantage in server clusters in other types of networks, including other types of client/server networks as well as peer-to-peer networks. In addition, this technique is applicable to other computing environments where load-based dispatching to an aggregate of servers is used; examples include transaction processing, file serving, application serving, messaging, mail serving, and many others.

Also, the exemplary server cluster has been described in terms of a particular hardware and software architecture; however, that architecture should not be construed in a limiting sense. For example, the dispatcher need not execute on a separate machine, but could, for example, run together with server software on one of the server machines. Also, although the server machines are illustrated as dedicated servers, the purposes served by those machines could alternatively be a served by general-purpose computers programmed according to the teachings herein and provided with one or more network interface devices such as an Ethernet card. Indeed, the types of data processing systems with which the present invention could be utilized include, without limitation, general-purpose personal computers, multiprocessor systems, mini-computers, and mainframe computers. Furthermore, although only a single dispatcher is illustrated in the exemplary embodiment, in alternative embodiments a secondary dispatcher could be provided on a separate machine or on one of the server machines, with the server cluster configured in such a way that the secondary dispatcher takes over in case of failure of the primary dispatcher.

Further, although the logical components such as the usage history and the PFA logic are illustrated as part of the rejuvenation manager, in alternative embodiments some or all of those components or parts thereof could be relocated. For example, the usage history could be generated and stored in the dispatcher by components external to the rejuvenation manager. Likewise, the rejuvenation manager or portions thereof (such as the PFA logic) could be relocated: for example, to one or more of the server machines. Those of ordinary skill in the art will appreciate that myriad additional redistributions of components and functionality could be made without departing from the spirit of the present invention. It should further be appreciated that, although the health reporters and the rejuvenation manager are implemented as software in the illustrative embodiment, those components or portions thereof could be implemented as software, hardware, firmware, or a combination of these. Also, although the exemplary process described above is performed in an entirely sequential manner, in alternative embodiments two or more portions of the operations could be performed substantially in parallel.

It is therefore contemplated that various modifications, including, without limitation, those described above, can be made without departing from the spirit or scope of the present invention as defined in the appended claims.

In addition, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of automatically rejuvenating a component of a distributed data processing environment while minimizing the disruptive effects of the rejuvenation, said method comprising:

storing a usage history for a distributed data processing environment, said usage history describing multiple levels of overall usage of said distributed data processing environment over time;

receiving health data relating to at least one component of said distributed data processing environment;

in response to receiving said health data, automatically utilizing said health data to determine a failure time within which said at least one component is likely to require rejuvenation;

in response to determining said failure time, automatically utilizing said usage history to identify an optimum rejuvenation time; and in response to identifying said optimum rejuvenation time, automatically rejuvenating said at least one component according to said optimum rejuvenation time.

2. The method of claim 1, wherein said step of automatically utilizing said usage history to identify an optimum rejuvenation time comprises:

ascertaining a minimum level of overall usage among said multiple levels within said failure time; and identifying a usage time that corresponds to said minimum level as said optimum rejuvenation time.

3. The method of claim 1, said distributed data processing environment being implemented as a server cluster, said at least one component including two or more servers, and said server cluster including a dispatcher that obtains performance data from said two or more servers and utilizes said performance data to distribute work among said two or more servers, wherein:

said step of receiving health data comprises receiving said health data from said two or more servers; and said step of automatically determining a failure time comprises automatically utilizing said health data to determine said failure time.

4. The method of claim 3, wherein:

said failure time is associated with an identified server among said two or more servers; and said step of automatically rejuvenating said component according to said optimum rejuvenation time comprises automatically rejuvenating said identified server.

5. The method of claim 4, wherein:

said step of rejuvenating said identified server comprises, at least one of restarting an application of said identified server and rebooting said identified server.

6. The method of claim 4, said health data including application health data describing a condition of one or more applications executing on at least one of said two or more servers, wherein:

said step of automatically determining a failure time comprises automatically utilizing said application health data to determine said failure time and to identify an application among said one or more applications associated with said failure time; and said step of rejuvenating said identified server comprises restarting said identified application.

7. A data processing system with facilities for automatically rejuvenating a component of a distributed data processing environment while minimizing the disruptive effects of the rejuvenation, said data processing system comprising:

a usage monitor that stores a usage history for a distributed data processing environment, said usage history describing multiple levels of overall usage of said distributed data processing environment over time;

prediction logic, that receives health data relating to at least one component of said distributed data processing environment and that, responsive to receipt of said health data, automatically utilizes said health data to determine a failure time within which said at least one component is likely to require rejuvenation;

scheduling logic that, responsive to determination of said failure time, automatically utilizes said usage history to identify an optimum rejuvenation time; and rejuvenation logic that, responsive to identification of said optimum rejuvenation time, automatically rejuvenates said at least one component according to said optimum rejuvenation time.

8. The data processing system of claim 7, wherein said scheduling logic automatically identifies said optimum rejuvenation time by:

ascertaining a minimum level of overall usage among said multiple levels within said failure time; and identifying a usage time that corresponds to said minimum level as said optimum rejuvenation time.

9. The data processing system of claim 7, said distributed data processing environment being implemented as a server cluster, said at least one component including two or more servers, and said server cluster including a dispatcher that obtains performance data from said two or more servers and utilizes said performance data to distribute work among said two or more servers, wherein:

said prediction logic receives said health data from said two or more servers; and said prediction logic utilizes said health data to automatically determine said failure time.

10. The data processing system of claim 9, wherein:

said failure time is associated with an identified server among said two or more servers; and said rejuvenation logic automatically rejuvenates said component by automatically rejuvenating said identified server.

11. The data processing system of claim 10, wherein:

said rejuvenation logic automatically rejuvenates said identified server by performing at least one of restarting an application of said identified server and rebooting said identified server.

12. The data processing system of claim 10, said health data including application health data describing a condition of one or more applications executing on at least one of said two or more servers, wherein:

said prediction logic utilizes said application health data to automatically determine said failure time;

said prediction logic utilizes said application health data to automatically identify an application among said one or more applications associated with said failure time; and said rejuvenation logic rejuvenates said identified server by restarting said identified application.

13. A program product for automatically rejuvenating a component of a distributed data processing environment while minimizing the disruptive effects of the rejuvenation, said program product comprising:

a usage monitor that stores a usage history for a distributed data processing environment, said usage history describing multiple levels of overall usage of said distributed data processing environment over time;

prediction logic that receives health data relating to at least one component of said distributed data processing environment and that, responsive to receipt of said health data, automatically utilizes said health data to determine a failure time within which said at least one component is likely to require rejuvenation;

scheduling logic that, responsive to determination of said failure time, automatically utilizes said usage history to identify an optimum rejuvenation time;

rejuvenation logic that, responsive to identification of said optimum rejuvenation time, automatically rejuvenates said at least one component according to said optimum rejuvenation time; and a computer-usable medium encoding said usage monitor, said prediction logic, said scheduling logic, and said rejuvenation logic.

14. The program product of claim 13, wherein said scheduling logic automatically identifies said optimum rejuvenation time by:

ascertaining a minimum level of overall usage among said multiple levels within said failure tame; and identifying a usage time that corresponds to said minimum level as said optimum rejuvenation time.

15. The program product of claim 13, said distributed data processing environment being implemented as a server cluster, said at least one component including two or more servers, and said server cluster including a dispatcher that obtains performance data from said two or more servers and utilizes said performance data to distribute work among said two or more servers, wherein:

said prediction logic receives said health data from said two or more servers; and said prediction logic utilizes said health data to automatically determine said failure time.

16. The program product of claim 15, wherein:

said failure time is associated with an identified server among said two or more servers; and said rejuvenation logic automatically rejuvenates said component by automatically rejuvenating said identified server.

17. The program product of claim 16, wherein:

said rejuvenation logic automatically rejuvenates said identified server by performing at least one of restarting an application of said identified server and rebooting said identified server.

18. The program product of claim 16, said health data including application health data describing a condition of one or more applications executing on at least one of said two or more servers, wherein:

said prediction logic utilizes said application health data to automatically determine said failure time;

said prediction logic utilizes said application health data to automatically identify an application among said one or more applications associated with said failure time; and said rejuvenation logic rejuvenates said identified server by restarting said identified application.

19. The program product of claim 13, wherein:

said computer-usable medium encodes a rejuvenation manager that includes said usage monitor, said prediction logic, said scheduling logic, and said rejuvenation logic.

* * * * *